(12) United States Patent
Akieda

(10) Patent No.: US 6,543,147 B2
(45) Date of Patent: Apr. 8, 2003

(54) TILT DETECTOR

(75) Inventor: Shinichiro Akieda, Shinagawa (JP)

(73) Assignee: Fujitsu Takamisawa Component Limted, Tokyo (JP)

(*) Notice: Subject to any disclaimer, the term of this patent is extended or adjusted under 35 U.S.C. 154(b) by 0 days.

(21) Appl. No.: 09/897,066

(22) Filed: Jul. 3, 2001

(65) Prior Publication Data
US 2002/0073564 A1 Jun. 20, 2002

(30) Foreign Application Priority Data

Dec. 14, 2000 (JP) ........................ 2000-380874

(51) Int. Cl.$^7$ ................................. G01C 9/12
(52) U.S. Cl. ..................... 33/366.24; 33/391; 340/440; 340/689
(58) Field of Search ............... 33/366.24, 365, 33/366.11, 366.25, 374, 375, 391, 397, 398, 399, 384, 387, 388; 340/933, 975, 974, 976, 425.5, 440, 551, 689; 324/207.11, 207.13, 207.15, 207.2, 207.21

(56) References Cited

U.S. PATENT DOCUMENTS 2,455,865 A * 12/1948 Houser .................... 33/399
4,557,056 A * 12/1985 Kim et al. ............... 33/366.24
5,365,671 A * 11/1994 Yaniger ....................... 33/365
6,301,795 B1 * 10/2001 Kang ............................ 33/365

FOREIGN PATENT DOCUMENTS

| JP | 60-154108 | * 8/1985 | ............ 33/366.24 |
| JP | 3-293515 | * 12/1991 | ............ 33/366.24 |
| JP | 7-63556 | 3/1995 | |
| JP | 8-261758 | 10/1996 | |
| JP | 9-501498 | 2/1997 | |
| WO | 95-04916 | 2/1995 | |

* cited by examiner

Primary Examiner—Christopher W. Fulton
(74) Attorney, Agent, or Firm—Staas & Halsey LLP

(57) ABSTRACT

A tilt detector includes a magnet, a plurality of magneto-electric transducers, a container, and a mounting member for mounting the magnet. The mounting member is rotatably supported within the container and the plurality of magneto-electric transducers is mounted on the container. The tilt detector detects a tilt condition from signals generated by the magnetoelectric transducers due to changes in a relative position of the magnet and the magnetoelectric transducers as the mounting member rotates within the container.

9 Claims, 13 Drawing Sheets

TILT DETECTOR

BACKGROUND OF THE INVENTION

1. Field of the Invention

The present invention relates to a tilt detector, and more particularly, to a tilt detector that outputs an electrical signal indicating a tilt condition.

2. Description of Related Art

In some applications, tilt detectors are used together with alarms for automobiles, safes and the like as theft prevention systems, in which the tilt detector is used to sense tilt or vibration from unauthorized attempted access, thus triggering the alarm.

In some other applications, tilt detectors are linked to switches or breakers and installed in electric heaters or gas burners as secondary fire prevention mechanisms. The tilt detectors trigger the switch or breaker to cut off operation of the appliances if the appliances are upset during an earthquake, for example.

Such conventional tilt detectors have typically used spring power. However, a disadvantage of such spring-powered tilt detectors is that they sometimes generate false alarms, that is, are triggered by the shock of vibration even in the absence of a tilt.

As a consequence, tilt detectors employing a combination of magnets and magnetoelectric transducers have come into widespread use. The advantages of such tilt detectors lie in their ability to reduce the number of false positive readings generated by the typical spring-powered tilt detector and by the high degree of accuracy and precision such tilt detectors afford.

A cross-sectional view of a typical conventional magnetic tilt detector is shown, for example, in FIG. 1, reproduced from Japanese Laid-Open Patent Application No. 8-261758.

As shown in the diagram, the tilt detector 5a supports 1a and 1b form an upwardly concave surface area portion 2a, along which a permanent magnet 3a moves freely, with magnetic detectors 4a positioned so as to detect the permanent magnet 3a.

In such a tilt detector 5a, a second, downwardly convex portion 2b coaxial with the upwardly concave portion 2a is spaced evenly opposite such concave portion 2a by a certain distance. The permanent magnet 3a is inserted in the curved slot formed between the surfaces of the two portions 2a and 2b, with at least three magnetic detectors positioned around the edges of the downwardly convex portion 2b. The permanent magnet 3a consists of a core covered by a resin compound, with the curved portions 2a and 2b being made of metal plates. A lubricating oil is inserted as necessary in the space between the two portions, to allow the permanent magnet 3a to slide more smoothly.

Additionally, FIG. 2 is a cross-sectional view of a conventional tiltmeter, reproduced, for example, from Japanese Laid-Open Patent Application No. 9-501498.

As shown in FIG. 2, a tiltmeter 5b uses a spherical base element 7 that contains a magnet 3b suspended in an inert fluid 6, such that the magnet 3b generates an imbalance in weight distribution as it moves.

The tiltmeter 5b maintains the uneven weight distribution with respect to the pull of gravity on the base element 7, with the position of the magnet 3b on the base element 7 with respect to a housing 8 being detected by a pair of symmetrically disposed Hall effect sensors 4b mounted on the housing 8. Since the magnet 3b is disposed so as to rotate freely, for example, detection in two directions is possible.

However, a drawback of the conventional magnetic tilt detectors and tiltmeters described above is that, in instances in which the tilt detector is placed not on a level surface but on a tilted surface, it becomes more difficult to obtain precise and accurate detection of the degree of tilt because the relative positions of the magnet (which is trying to attain a perpendicular position) and the magnetic detectors (which are aligned with the tilted surface) have changed and the gap between the two has widened. An added drawback of such conventional magnetic tilt detectors and tiltmeters is that the magnet either slides along another member or moves through a fluid, thus slowing the response time to a tilt.

Additionally, it should be noted that the conventional tilt detector has a further drawback in that the structure of such a device imposes sharp limits on the range through which tilt can be detected.

BRIEF SUMMARY OF THE INVENTION

Accordingly, it is an object of the present invention to provide an improved and useful tilt detector in which the above-described disadvantage is eliminated.

A further and more specific object of the present invention is to provide an improved and useful tilt detector in which a tilt condition can be sensed precisely and accurately over a wide range of angles.

Another, further and more specific object of the present invention is to provide an improved and useful tilt detector in which precise and accurate tilt readings can be provided rapidly.

Still another, further and more specific object of the present invention is to provide an improved and useful tilt detector capable of providing prompt, precise and accurate readings even when necessity requires that it be mounted on an inclined surface.

The above-described objects of the present invention are achieved by a tilt detector comprising:

a magnet;

a plurality of magnetoelectric transducers;

a container; and a mounting member for mounting the magnet, the mounting member rotatably supported within the container by a bearing mechanism, the plurality of magnetoelectric transducers being mounted on the container, the tilt detector detecting a tilt condition from signals generated by the magnetoelectric transducers due to changes in a relative position of the magnet and the magnetoelectric transducers as the mounting member rotates within the container.

According to this aspect of the invention, the mounting member is rotatably supported by the bearing mechanism, eliminating the possibility of vertical blurring present with those conventional tilt detectors that rely solely on fluid-encapsulation of the mounting member because the bearing mechanism maintains the mounting member at a precise predetermined axis point, thus providing improved precision and accuracy in detecting tilt positions. Additionally, by providing the magnet on a mounting member that is free to rotate, a tilt can be sensed over a wide range of angles, and the low resistance offered by the bearing mechanism to the movement of the mounting member enables the tilt detector to provide rapid readings of a tilt condition.

Additionally, the above-described objects of the present invention are also achieved by the tilt detector as described above, further comprising a weight mounted on the container.

According to this aspect of the invention, by arranging the magnet and the weight at an appropriate distance from each other at an initial inclined condition, it is possible to adjust the distance separating the magnet and the magnetoelectric transducers as desired, with the result that a tilt can be detected precisely and accurately even when the tilt detector is mounted on an inclined surface to begin with.

According to another aspect of the present invention, the space between the interior surface of the container and the exterior surface of the mounting member is filled with a lubricating fluid so as to immerse the bearing mechanism in the fluid, thus obtaining the advantage of retarding sharp movements of the mounting member (caused, for example, by the shock of impact to the target object) together with the stability of positioning of the mounting member within the container provided by the use of the bearing mechanism. The result is that it becomes possible to reduce the number of false alarm readings caused by momentary and unstable high tilt detection readings, thus improving overall tilt detection accuracy.

BRIEF DESCRIPTION OF THE DRAWINGS

These and other objects, features, aspects and advantages of the present invention will become better understood and more apparent from the following description, appended claims and accompanying drawings, in which:

DETAILED DESCRIPTION OF THE INVENTION

A description will now be given of embodiments of the present invention, with reference to the accompanying drawings. It should be noted that identical or corresponding elements in the embodiments are given identical or corresponding reference numbers in all drawings, with detailed descriptions of such elements generally given once and thereafter omitted.

Figure 1:
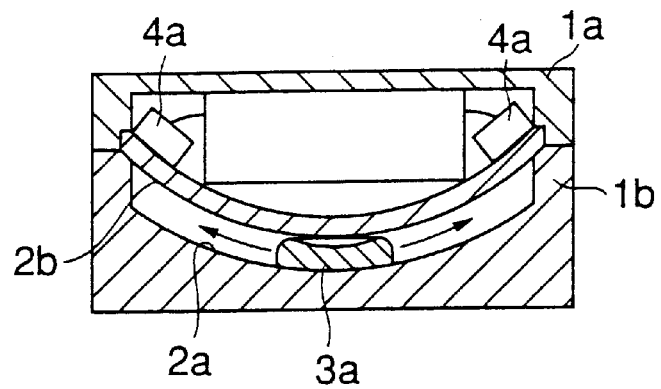
FIG. 1 is a cross-sectional view of a conventional tilt detector.
Figure 2:
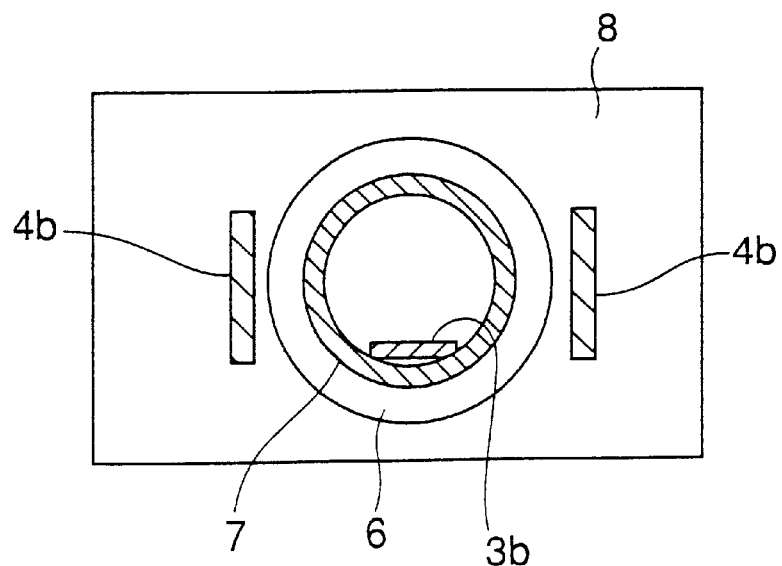
FIG. 2 is a cross-sectional view of a conventional tiltmeter.
Figure 3:
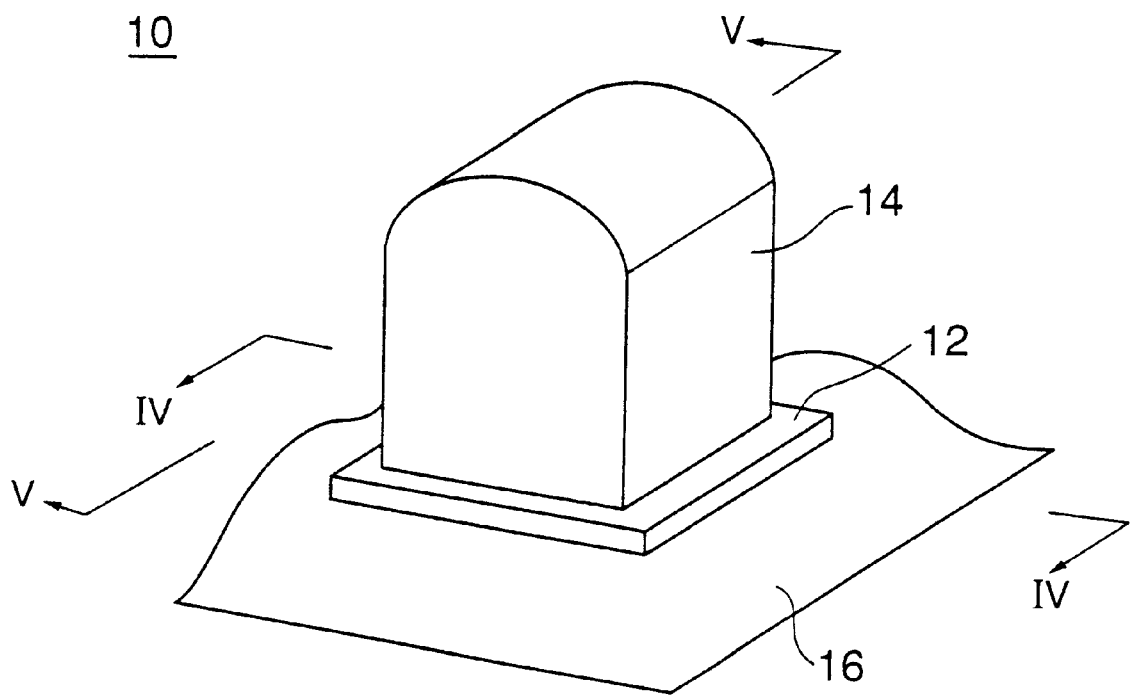
FIG. 3 is a perspective view of a tilt detector according to a first embodiment of the present invention.
Figure 4:
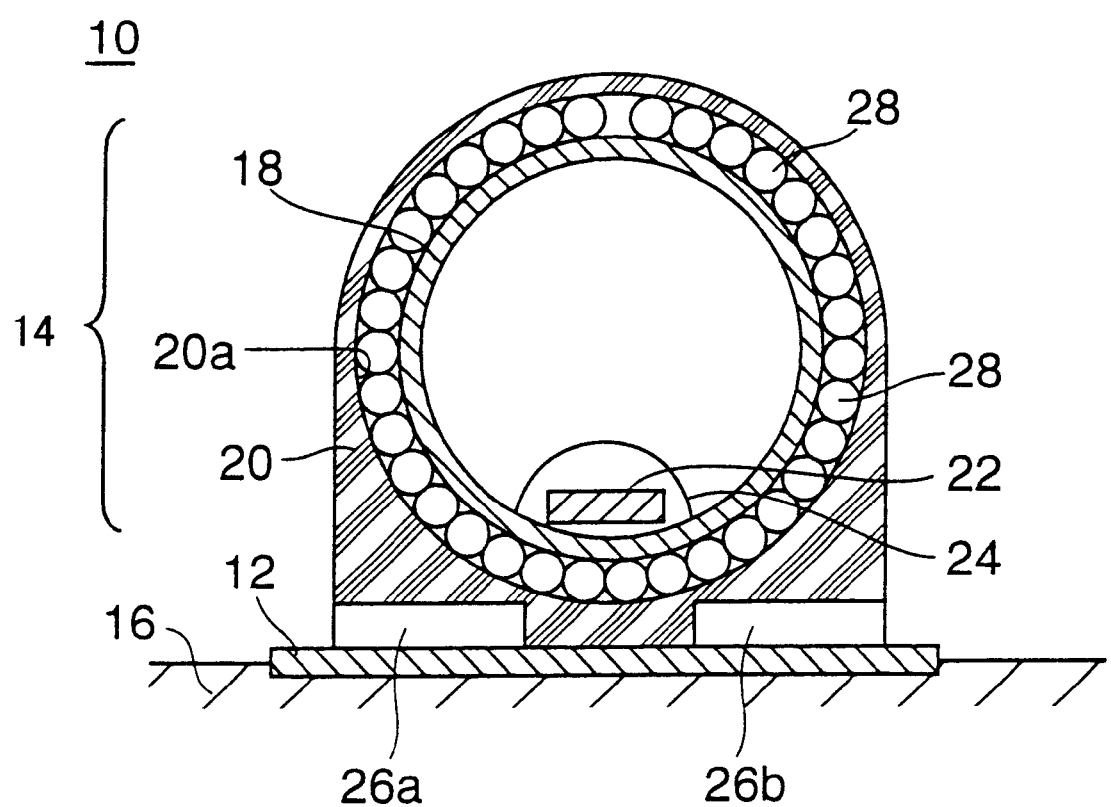
FIG. 4 is a cross-sectional view of a tilt detector according to a first embodiment of the present invention, along a line IV—IV as shown in FIG. 3.
Figure 5:
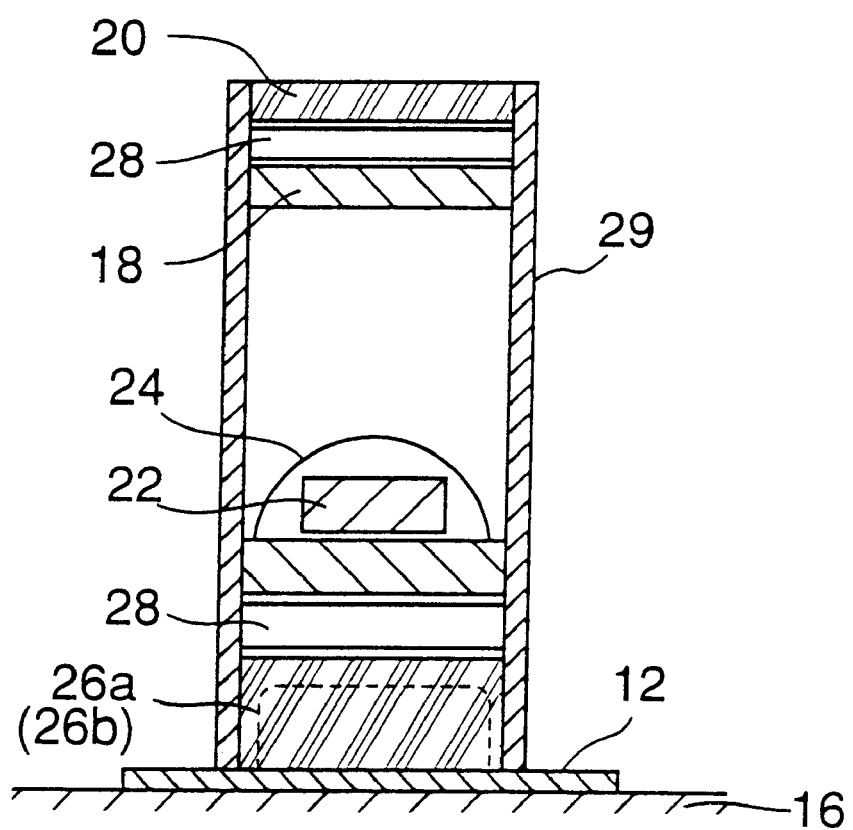
FIG. 5 is a cross-sectional view of a tilt detector according to a first embodiment of the present invention, along a line V—V as shown in FIG. 3.
Figure 6:
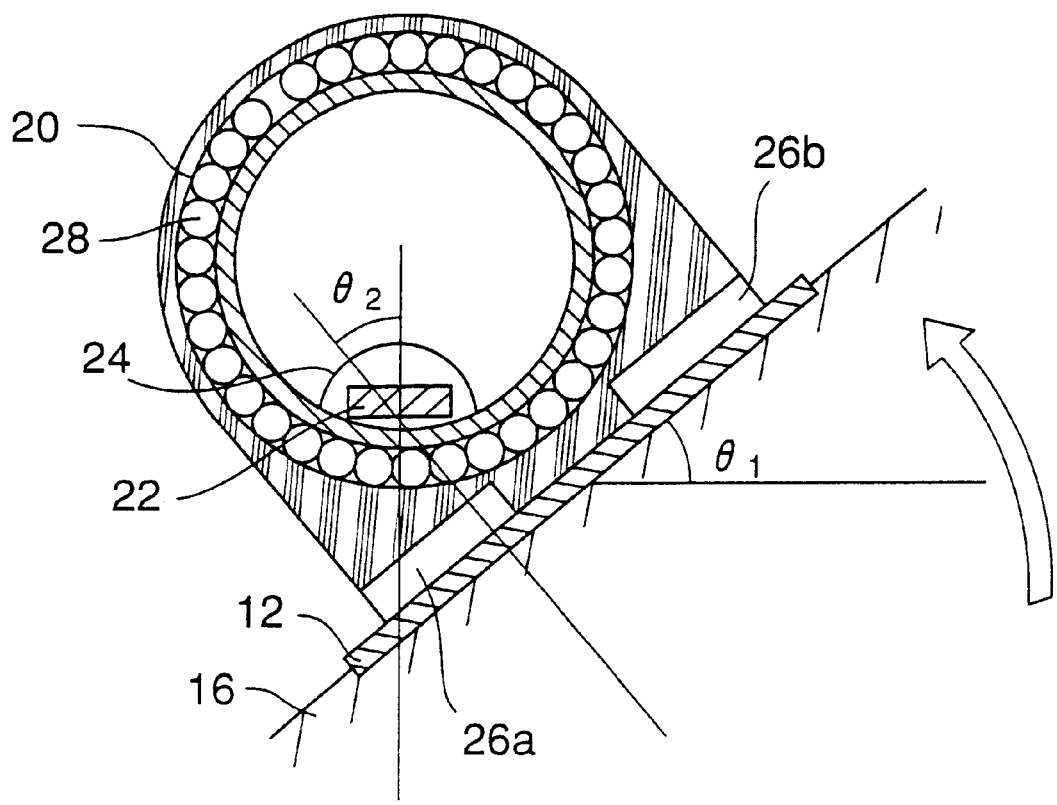
FIG. 6 is a cross-sectional view of a tilt detector according to a first embodiment of the present invention, for the purpose of illustrating an operation thereof in a case in which a target object is in a tilted condition.
Figure 7:
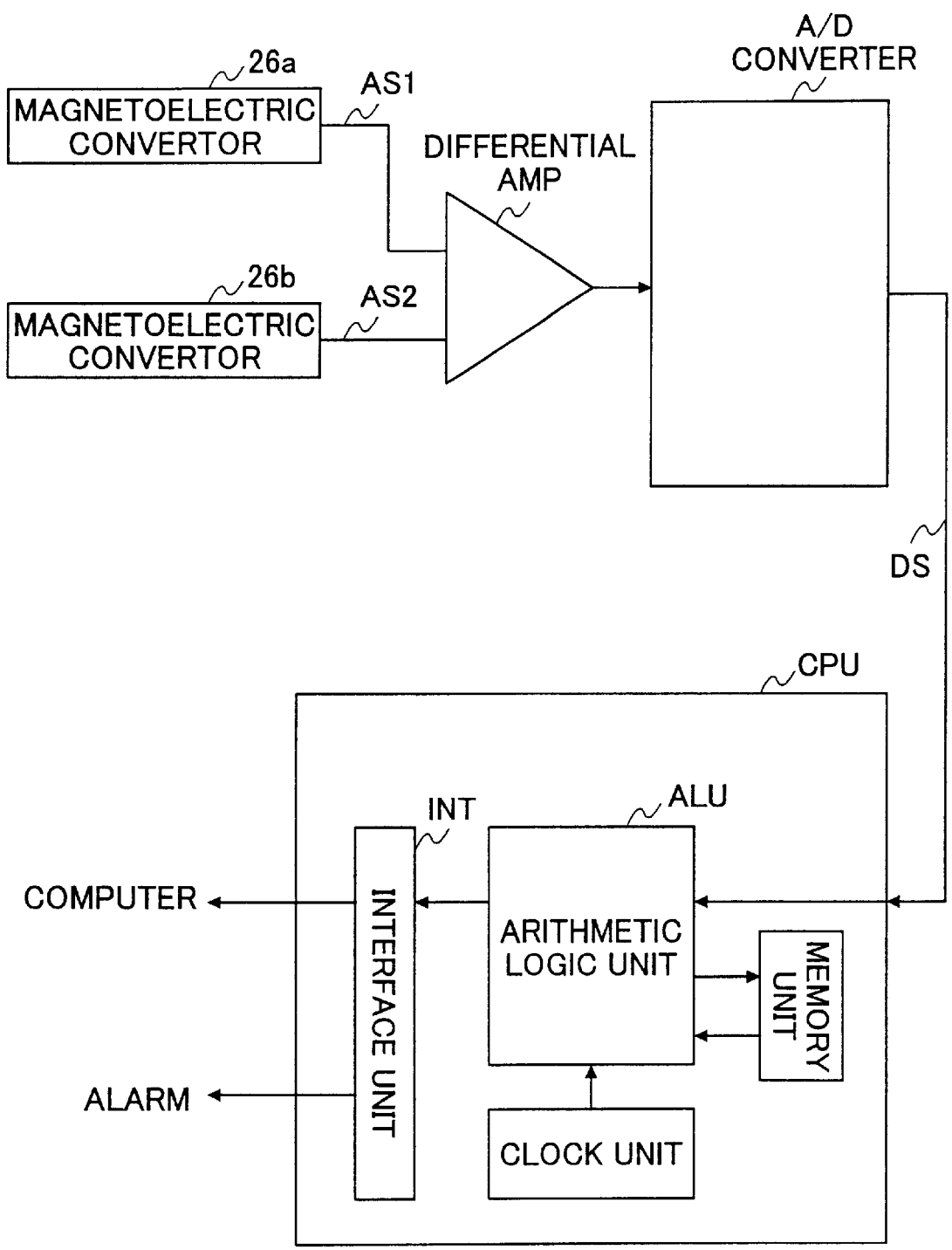
FIG. 7 is a block diagram illustrating processing signal circuitry signal circuitry of a tilt detector according to a first embodiment of the present invention.
Figure 8:
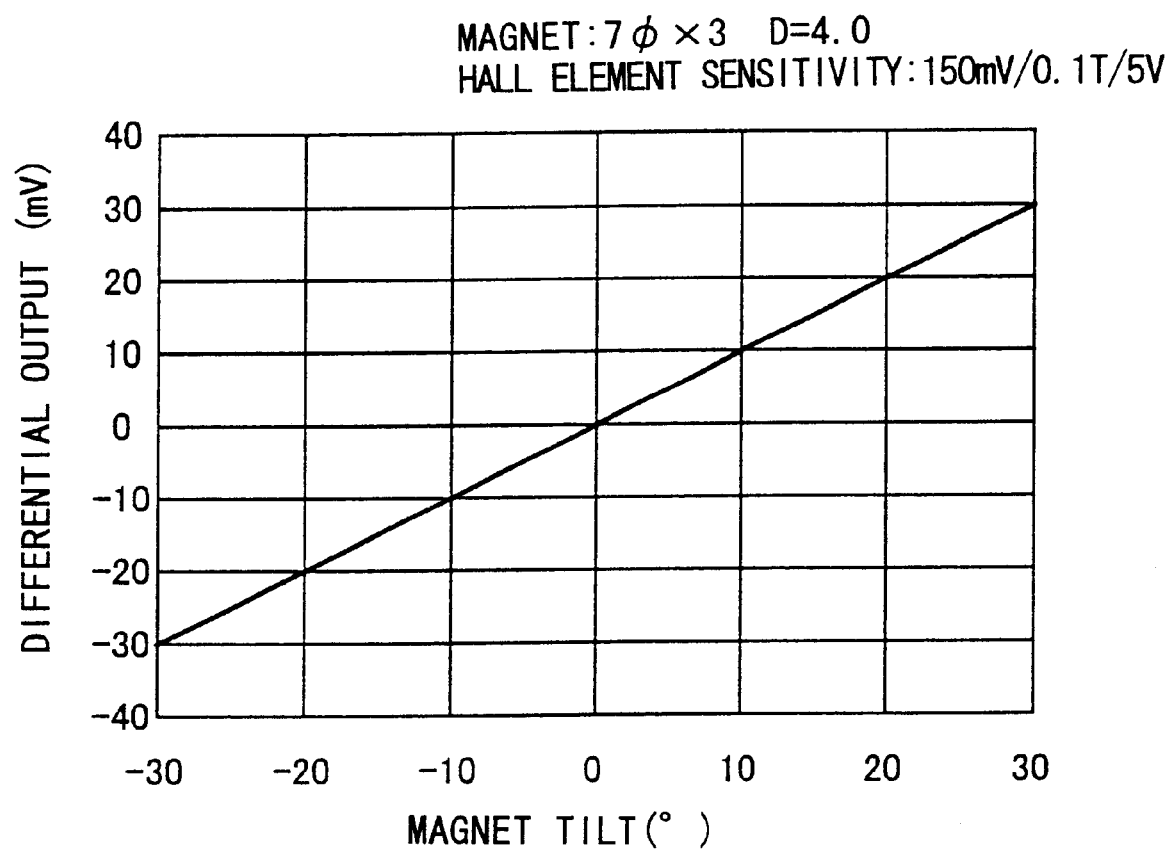
FIG. 8 is a graph showing a relation between degree of magnet tilt and differential output voltage in a tilt detector according to a first embodiment of the present invention.

FIG. 3 is a perspective view of a tilt detector according to a first embodiment of the present invention. FIG. 4 is a cross-sectional view of a tilt detector according to a first embodiment of the present invention, along a line IV—IV as shown in FIG. 3. FIG. 5 is a cross-sectional view of a tilt detector according to a first embodiment of the present invention, along a line V—V as shown in FIG. 3. FIG. 6 is a cross-sectional view of a tilt detector according to a first embodiment of the present invention, for the purpose of illustrating an operation thereof in a case in which a target object is in a tilted condition. FIG. 7 is a block diagram illustrating signal processing circuitry of a tilt detector according to a first embodiment of the present invention. FIG. 8 is a graph showing a relation between degree of magnet tilt and differential output voltage in a tilt detector according to a first embodiment of the present invention.

As shown in FIG. 3, a tilt detector 10 comprises, for example, a rectangular base 12 and a substantially square main body 14 having a curved upper surface, the main body 14 being mounted atop the rectangular base 12. The tilt detector 10 functions by being mounted on a target object 16 whose angle of inclination is to be detected, in this case, for example, a location in the interior of an automobile.

The main body 14, as shown in FIG. 4 and FIG. 5, comprises, in this embodiment, a cylindrical mounting member 18 and a container 20 formed so as to enclose a substantially cylindrical space designated in the drawings with the reference numeral 20a. In this embodiment, the container 20 and the base 12 form a single integrated unit. However, such a configuration is not a required element of the present invention, and consequently, the container 20 and the base 12 may be formed as separate parts as necessary and appropriate.

The base 12 may, for example, be composed of a glass fabric based epoxy resin substrate layer. The mounting member 18 and the container 20 should be of a nonmagnetic material, for example, a nonmagnetic metal such as aluminum.

A magnet 22 is mounted on an interior surface of the mounting member 18, with a weight 24 mounted thereon in such a way as to cover and enclose the magnet 22. The weight 24 may, for example, be composed of a metal material. It should be noted that, if the magnet 22 is of a predetermined sufficiently large mass, then the weight 24 may be dispensed with entirely.

A pair of magnetoelectric transducers 26a, 26b are provided between a bottom of the container 20 and a top of the base 12. The pair of magnetoelectric transducers 26a, 26b is disposed parallel to a longitudinal axis of the mounting member 18. It is preferred that the magnetoelectric transducers 26a, 26b be Hall elements because of their cheapness and small size.

As shown for example in FIG. 4, a plurality of metallic rods 28 are inserted in the space between the mounting member 18 and the container 20. The rods 28, which rotate, are disposed so as to be parallel to the longitudinal axis of the cylindrical mounting member 18. These rods comprise one embodiment of the bearing mechanism described in the claims.

Longitudinal ends of the mounting member 18 and the container 20 are sealed by a cap member 29.

In the tilt detector 10 having the structure described above, the weight 24 attempts to maintain a position prior to inclination whenever the base 12 mounted atop the target object 16 inclines as shown for example in FIG. 6, as a result of which the mounting member 18 does not displace. Therefore, the mounting member 18 is supported by the rods 28 and rotates with respect to the container 20 and the substrate 12.

The tilt detector 10 is equipped with signal processing circuitry (not shown in FIGS. 3, 4 and 5) for processing signals from the magnetoelectric transducers 26a, 26b, such as that shown in FIG. 7.

A description will now be given of an operation of such a signal processing circuit.

The difference between the analog output signals AS1, AS2 of the pair of magnetoelectric transducers 26a, 26b, whose output levels vary according to the degree of tilt of the target object 16, is amplified by a differential amplifier and the amplified differential value output to an A/D converter, where it is converted into a digital output signal DS. The digital output signal DS is then transmitted to a central processing unit (CPU), where an arithmetic logic unit (ALU) corrects the output value. The digital DS signal is then sent via, for example, an interface unit INT, to an alarm or to a computer. If sent to an alarm, then when the signal level exceeds a set value an alarm is triggered, the alarm being either an audio alarm, a visual alarm, or both. If sent to a computer, then the degree of slant in response to the signal level is displayed or, as the case may be, a switch or a breaker (not shown in the diagram) connected to the computer is triggered.

A description will now be given of an operation of the tilt detector 10 having the structure described above.

As shown in FIG. 3 and FIG. 4, a tilt detector 10 having the structure described above, in a state in which the target object 16 is horizontal, the pair of magnetoelectric transducers 26a, 26b and the magnet 24 are equidistant from each other. Therefore, the magnetic field imparted to each of the magnetoelectric transducers 26a, 26b is identical, so that, if, for example, the direction of the detected magnetic field is perpendicular to the base 12, then the output voltage of the of the pair of magnetoelectric transducers 26a, 26b should be substantially identical.

By contrast, if, as is shown in FIG. 6, by some external force the target object 16 is, for example, tilted to an angle θ, then the magnetoelectric transducers 26a, 26b mounted on the base 12 also tilt. At the same time, however, the magnet 22 and the weight 24 to which the magnet 22 is attached in the present embodiment maintain their vertical position, so the mounting member 18 rotates in a clockwise direction with respect to the container 20 and the base 12. The magnet 22 forms an angle θ2 with respect to the base 12 using the vertical direction as a reference, the angle θ2 having a size identical to the angle θ1. As a result, the strength of the magnet field sensed by the magnetoelectric transducer 26a closer to the magnet 22 is greater than the strength of the magnetic field sensed by the magnetoelectric transducer 26b farther from the magnet, with a corresponding change in output voltage.

FIG. 8 is a graph showing a relation between degree of magnet tilt and differential output voltage (in mV) of a tilt detector according to a first embodiment of the present invention as described above.

It should be noted that, as indicated in the diagram, the relation described in FIG. 8 illustrates a case in which a ferrite magnet having a diameter of 7 mm and a thickness of 3 mm is used for the magnet 22, with a perpendicular distance D between the magnet 22 and the magnetoelectric transducers 26a, 26b being set at 4.0 mm. At the same time, the sensitivity of the Hall elements used for the magnetoelectric transducers 26a, 26b is set at 150 mV/0.1 T/5V, with the distance between magnetoelectric transducers 26a, 26b being set at 6.0 mm. As can be seen from the diagram, the relation between the angle of inclination $\theta_2$ and the differential output of the magnetoelectric transducers 26a, 26b is substantially proportional, that is, a straight line.

In the tilt detector 10 according to a first embodiment of the present invention as described above, the mounting member 18 for mounting the magnet 22 is supported by the plurality of rods 28, so, for example, as compared to a case in which a fluid is substituted into the space enclosed by the cylinder in place of the plurality of rods 28, the longitudinal axis of the mounting member 18 can be held at a predetermined position. As a result, the shaking of the magnet vertically or horizontally can be avoided, thus enabling the tilt detector 10 to read the degree of rotation of the mounting member 18 with precision and accuracy, as well as rapidly.

Additionally, the mounting member 18 should in principle be able to rotate through 360°, so it should be possible to obtain tilt readings over a wide range of situations.

A description will now be given of a tilt detector according to a variation of a first embodiment of the present invention, with reference in the first instance to FIG. 9.

Figure 9:
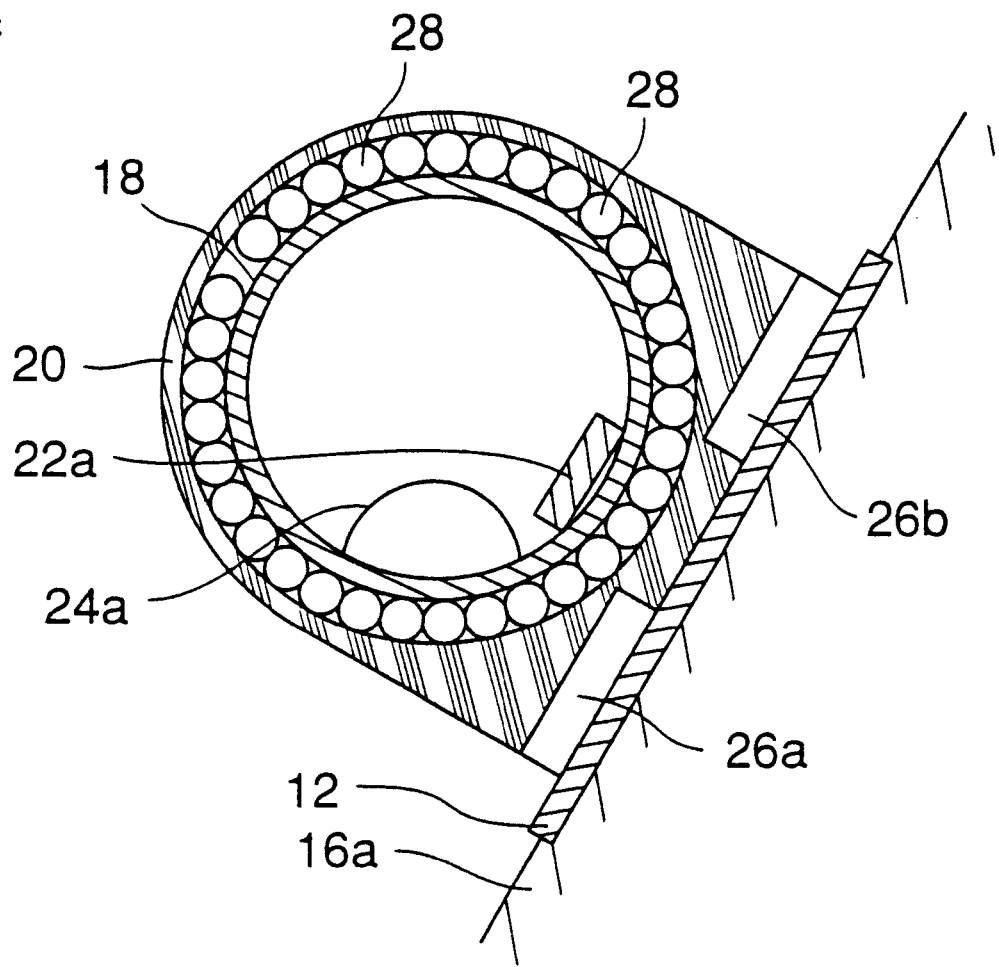
FIG. 9 is a cross-sectional view of a tilt detector according to a variation of a first embodiment of the present invention.

FIG. 9 is a cross-sectional view of a tilt detector according to a variation of a first embodiment of the present invention.

As shown in FIG. 9, the chief difference between the tilt detector 10 according to the first embodiment of the present invention and the tilt detector 10a according to a variation of the first embodiment of the present invention is that the latter separates the magnet 22a and the weight 24a such that the two do not form a single integrated unit as in the former. The magnet 22a and the weight 24a are both mounted on an interior surface of the mounting member 18, separated a predetermined distance from each other.

Then, as shown, the tilt detector 10a is mounted initially in a tilted state on the target object 16a. At this time the weight 24a maintains the vertical position whereas the magnet 22a assumes a position opposite the base 12 on which the magnetoelectric transducers 26a, 26b are placed. Such an arrangement keeps the magnet 22a and the magnetoelectric transducers 26a, 26b in relatively close proximity to each other, thereby improving the accuracy of the tilt detection readings. Accordingly, the present tilt detector can provide more precise and accurate detection of a degree of tilt than can the tilt detector 10 shown in FIG. 6.

A description will now be given of a tilt detector according to a second embodiment of the present invention, with reference to FIG. 10. It should be noted that this second embodiment and all subsequent embodiments described herein have essentially the same structure as that of the first embodiment and any variation thereof described herein.

Figure 10:
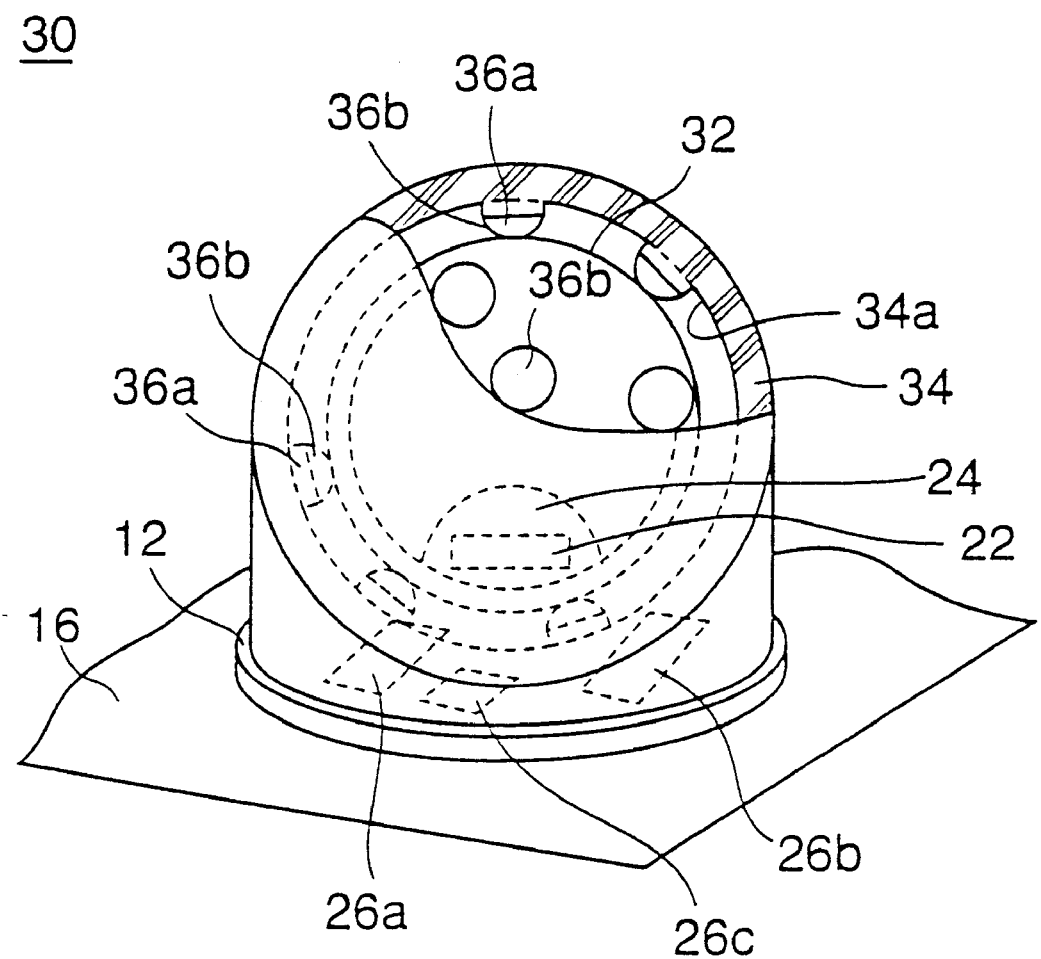
FIG. 10 is a perspective view of a tilt detector according to a second embodiment of the present invention.

FIG. 10 is a perspective view of a tilt detector according to a second embodiment of the present invention.

As shown in the diagram, the tilt detector 30 comprises a hollow spherical mounting member 32 and a container 34 enclosing a substantially spherical space 34a. The magnet 22 and the weight 24 are mounted on an interior surface of the hollow spherical mounting member 32. Ball bearings 36b are mounted in a plurality of supports provided on an interior surface of the container 34, so that the hollow spherical mounting member 32 is supported within the container 34 by the bearing mechanism so formed.

It should be noted that the bearings and supports comprise one embodiment of the bearing mechanism described in the claims.

Additionally, as can be appreciated by those skilled in the art, the bearing structure described above can be replaced by one in which ball bearings alone fill the space between the container 34 and the mounting member 32.

The base 12 mounts the magnetoelectric transducers 26a, 26b and additionally a second pair of magnetoelectric transducers 26c, 26d, the second pair mounted along an axis perpendicular to an axis of the first pair (of which second pair only 26c is shown in the diagram). Such a configuration enables magnetoelectric transducers 26a, 26b to detect a tilt along an X-axis direction and enables magnetoelectric transducers 26c, 26d to detect a tilt along a Y-axis direction. Moreover, processing the output of the magnetoelectric transducers 26a, 26b, 26c and 26d enables the tilt detector 30 to detect tilt in all 360°.

As described above, according to the tilt detector 30 according to the second embodiment of the present invention, the magnet is capable of tilting through all 360° whenever the target object 16 tilts, thus enabling the tilt detector 30 to detect a tilt throughout 360°.

A description will now be given of a tilt detector according to a third embodiment of the present invention, with reference to FIG. 11.

Figure 11:
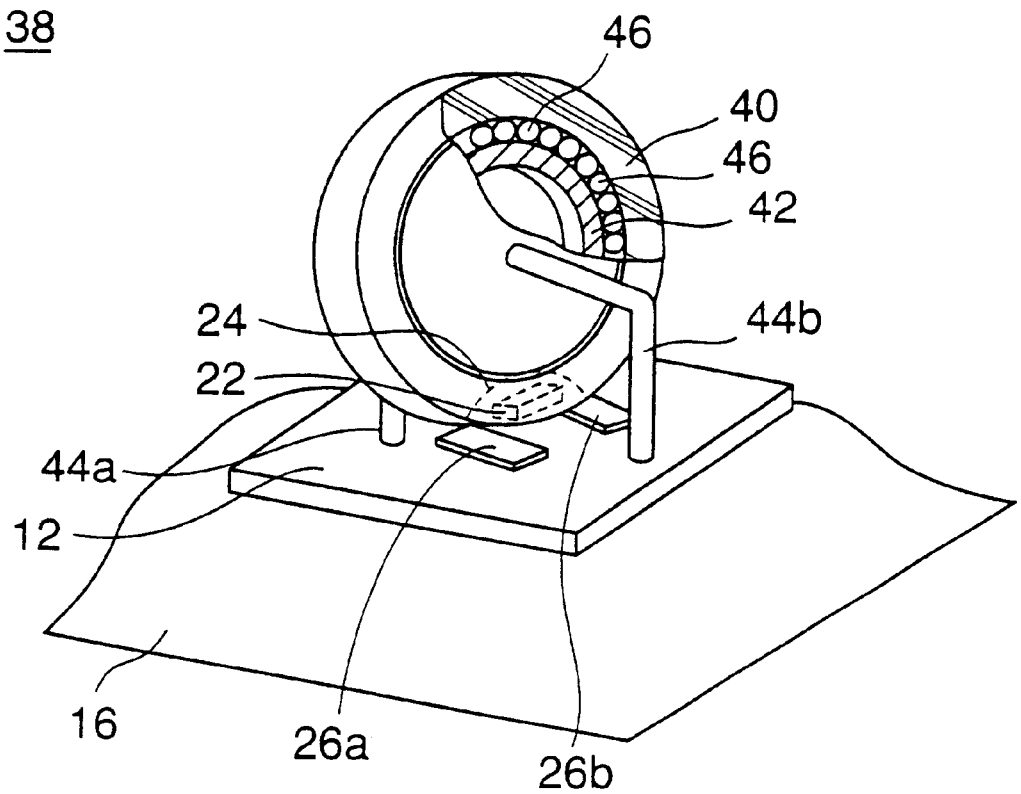
FIG. 11 is a perspective view of a tilt detector according to a third embodiment of the present invention.

FIG. 11 is a perspective view of a tilt detector according to a third embodiment of the present invention.

As shown in the diagram, a tilt detector 38 differs from the tilt detector 10 according to the first embodiment of the present invention insofar as the container 40 is cylindrical but not hollow, being essentially disk-shaped. As shown in the diagram, the magnet 22 and the weight 24 are mounted within the container 40. However, the magnet 22 and the weight 24 may instead be mounted on an exterior surface of the container 40.

A mounting member 42 having a generally disk-like shape is inserted in the container 40. The mounting member 42 itself is fixedly mounted on the base 12 by two support shafts 44a, 44b. It should be noted that these support shafts constitute one embodiment of the bearing mechanism described in the claims. As can be appreciated by those skilled in the art, in place of the pair of support shafts 44a, 44b it is possible to use the ball bearing arrangement described above with respect to the tilt detector 30 according to the second embodiment of the present invention.

As shown in the diagram, the pair of magnetoelectric transducers 26a, 26b are positioned directly beneath the magnet 22 and weight 24 atop the base 12.

Accordingly, when the target object 16 tilts, the mounting member 42 which is formed into a single unit with the base 12 by the support shafts 44a, 44b, tilts together with the target object 16. Also, the magnetoelectric transducers 26a, 26b mounted atop the base 12 also tilt. By contrast, the container 40 on which the magnet 22 and the weight 24 are mounted maintains the vertical position dictated by the magnet 22 and the weight 24. As a result, the magnetoelectric transducers 26a, 26b indicate a relative slant with respect to the magnet 22 so as to produce a reading of the angle of tilt.

As described above, the tilt detector 38 according to the third embodiment of the present invention positions the magnet 22 and the magnetoelectric transducers 26a, 26b relatively close to each other, thus enabling the tilt detector 38 to produce precise and accurate tilt angle detection readings.

A description will now be given of a tilt detector according to a fourth embodiment of the present invention, with reference to FIG. 12.

Figure 12:
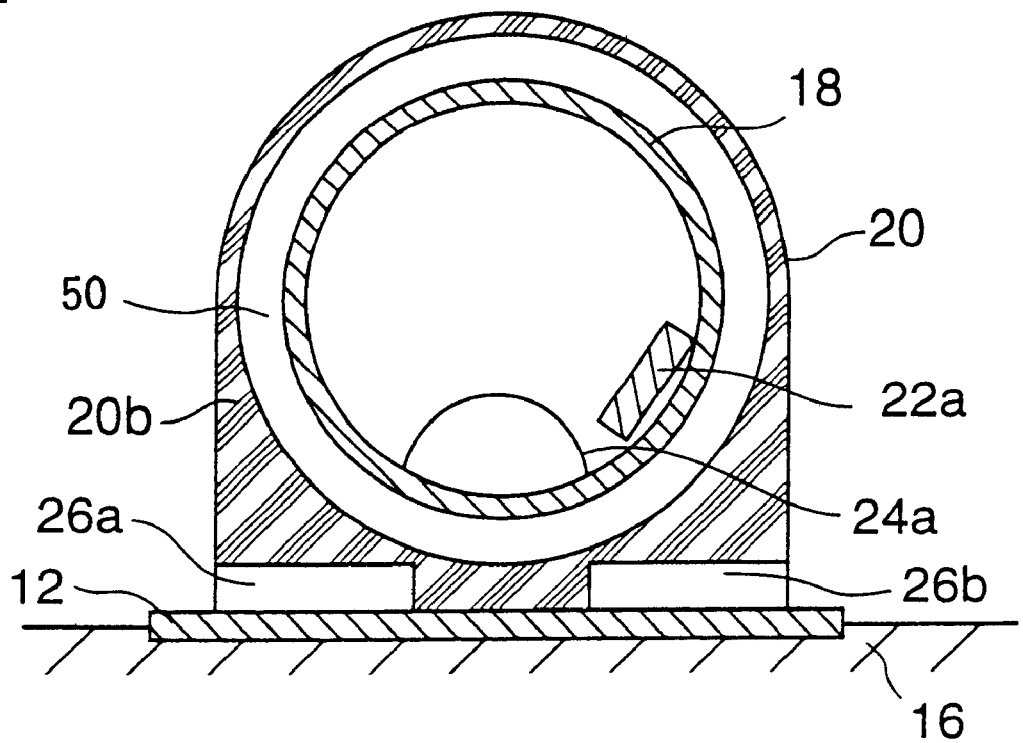
FIG. 12 is a cross-sectional view of a tilt detector according to a fourth embodiment of the present invention.

FIG. 12 is a cross-sectional view of a tilt detector according to a fourth embodiment of the present invention.

As shown in the diagram, the tilt detector 48 differs from the tilt detector 10 according to the first embodiment of the present invention insofar as in the tilt detector 48, the space between the mounting member 18 and the container 20 is filled with a fluid such as, for example, a lubricating oil 50, indicated in FIG. 12 by the reference numeral 20b. Additionally, the weight 24a and the magnet 22a are separated by a predetermined distance.

The tilt detector 48 according to the fourth embodiment of the present invention having the structure described above is capable of providing precise and accurate detection of tilt angles over a wide range along a single axis even when mounted on a tilted surface, because the magnet 22a and the magnetoelectric transducers 26a, 26b are kept in relatively close proximity to each other, thereby improving the accuracy of the tilt detection readings.

Additionally, the lubricating oil 50 acts to prevent rapid rotation of the mounting member 18, thereby cushioning the tilt detector 48 from the shock of impact on the target object 16 by a foreign object. The advantage of such a cushioning is that the triggering of false alarms due to momentarily high detection readings can be prevented, in effect eliminating the detection of noise.

A description will now be given of a tilt detector according to a fifth embodiment of the present invention, with reference to FIG. 13.

Figure 13:
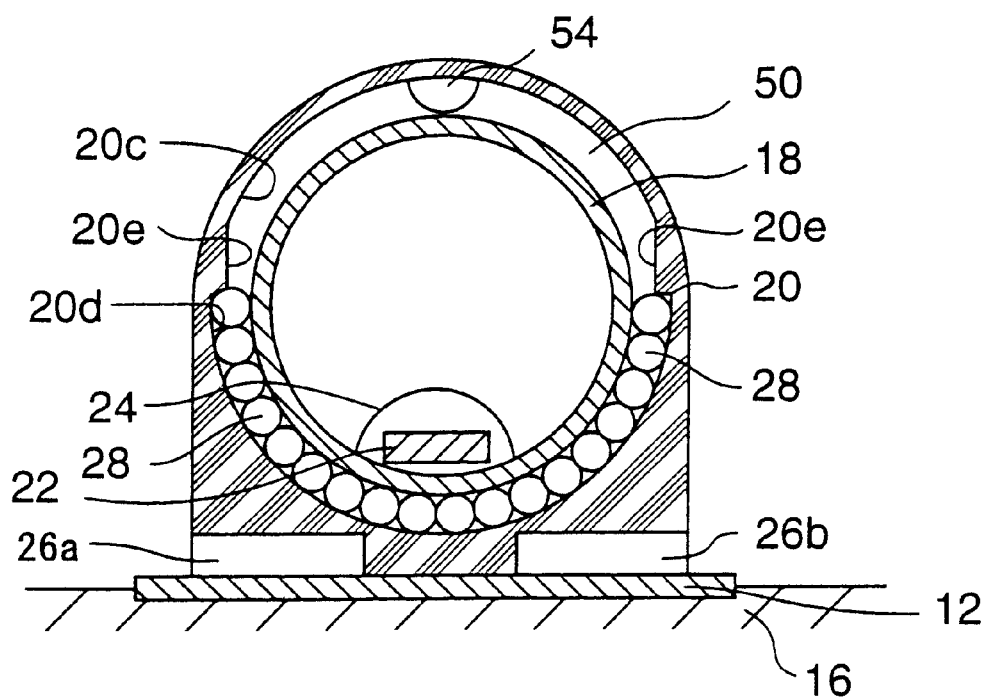
FIG. 13 is a cross-sectional view of a tilt detector according to a fifth embodiment of the present invention.

FIG. 13 is a cross-sectional view of a tilt detector according to a fifth embodiment of the present invention.

As shown in the diagram, a tilt detector 52 differs from the tilt detector 10 according to the first embodiment of the present invention in that, structurally, the space between the mounting member 18 and the container 20 is divided into three sections: An upper stage first section of relatively wide breadth 20c, a lower stage second section of relatively narrow breadth 20d, and a intermediate projection 20e positioned intermediate between the other two sections. A plurality of rods 28 are inserted into the lower stage second section 20d and a protuberance 54 projected downward from an interior surface of the container 20 is located at a top of the upper stage first section 20c, the latter so as to maintain the mounting member 18 in position and to maintain a certain slight distance between an exterior surface of the mounting member 18 and the interior surface of the container 20. Additionally, lubricating oil 50 is provided in the upper stage first section and the lower stage second section, another point of difference between the tilt detector 52 according to the fifth embodiment of the present invention and the tilt detector 10 according to the first embodiment of the present invention.

In the tilt detector 52 having the structure described above, the rods 28 act to smooth the rotary motion of the mounting member 18 while the lubricating oil 50 acts to retard that same rotary motion of the mounting member 18, the combined effect being to rotatably support the mounting member 18 in a stable manner and enabling the response speed of the tilt detector 52 to be moderated to an optimum rate as necessary.

A description will now be given of a tilt detector according to a sixth embodiment of the present invention, with reference to FIG. 14.

Figure 14:
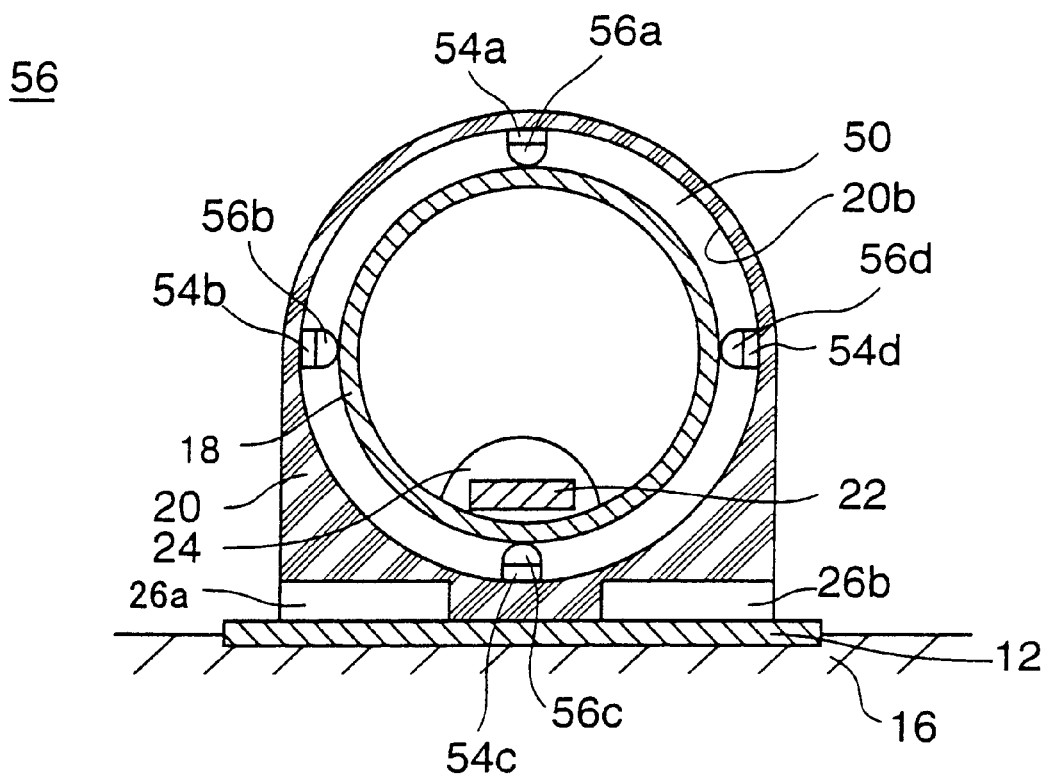
FIG. 14 is a cross-sectional view of a tilt detector according to a sixth embodiment of the present invention.

FIG. 14 is a cross-sectional view of a tilt detector according to a sixth embodiment of the present invention.

As shown in the diagram, the tilt detector 56 is structurally identical to the tilt detector 48 according to the fourth embodiment of the present invention described above, with a cylindrically shaped mounting member 18 contained within a container 20 enclosing a substantially cylindrical space.

Additionally, the tilt detector 56, like the tilt detector 52 according to the fifth embodiment of the present invention described above, employs a lubricating oil 50 inserted into the space 20b between the interior surface of the container 20 and the exterior surface of the mounting member 18. Additionally, the mounting member 18 is centrally rotatably positioned within the container by four evenly spaced supports protruding from the interior wall of the container 20, the four supports comprising base members 54a–54d and corresponding columns 56a–56d.

According to the tilt detector 56 according to the sixth embodiment of the present invention as described above, substantially the same effect as with the tilt detector 52 according to the fifth embodiment of the present invention as described above can be obtained with a relatively simplified structure, thus reducing production design and manufacturing costs.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 2000-380874, filed on Dec. 14, 2000, the contents of which are hereby incorporated by reference.

What is claimed is:

1. A tilt detector, comprising:
a container;
a magnet;
a mounting member to mount the magnet;
a bearing mechanism rotatably supporting the mounting member within the container;
a plurality of magnetoelectric transducers mounted on the container; and
the tilt detector detecting a tilt condition from signals generated by the magnetoelectric transducers due to changes in a relative position of the magnet and the magnetoelectric transducers as the mounting member rotates within the contain, wherein:
the container encloses a substantially cylindrical space,
the mounting member is substantially a hollow cylinder, and
the magnet is mounted on an interior surface of the cylindrical mounting member.

2. The tilt detector as claimed in claim 1, further comprising a weight mounted on the mounting member.

3. The tilt detector as claimed in claim 1, wherein the magnetoelectric transducers are Hall elements.

4. A tilt detector, comprising:
a container;
a magnet;
a mounting member to mount the magnet;
a bearing mechanism rotatably supporting the mounting member within the container;
a plurality of magnetoelectric transducers mounted on the container; and
the tilt detector detecting a tilt condition from signals generated by the magnetoelectric transducers due to changes in a relative position of the magnet and the magnetoelectric transducers as the mounting member rotates within the contain, wherein:
the container encloses a substantially spherical space, and
the mounting member is substantially a hollow sphere, and
the magnet is mounted on an interior surface of the spherical mounting member.

5. A tilt detector, comprising:
a container;
a magnet;
a mounting member to mount the magnet;
a bearing mechanism rotatably supporting the mounting member within the container;
a plurality of magnetoelectric transducers mounted on the container; and
the tilt detector detecting a tilt condition from signals generated by the magnetoelectric transducers due to changes in a relative position of the magnet and the magnetoelectric transducers as the mounting member rotates within the contain, wherein:
the container encloses a substantially cylindrical space,
the mounting member is substantially rod-shaped, and
the magnet is mounted on an exterior surface of the rod-shaped mounting member.

6. A tilt detector, comprising:
a container;
a magnet;
a mounting member to mount the magnet;
a weight mounted on the mounting member;
a bearing mechanism rotatably supporting the mounting member within the container, the bearing mechanism being immersed in a fluid inserted in a space between an interior surface of the container and an exterior surface of the mounting member;
a plurality of magnetoelectric transducers mounted on the container;
the tilt detector detecting a tilt condition from signals generated by the magnetoelectric transducers due to changes in a relative position of the magnet and the magnetoelectric transducers and the mounting member rotates within the container, wherein:
the container encloses a substantially cylindrical space,
the mounting member is substantially a hollow cylinder, and
the magnet is mounted on an interior surface of the cylindrical mounting member.

7. The tilt detector as claimed in claim 6, wherein the magnetoelectric transducers are Hall elements.

8. A tilt detector, comprising:
a container;
a magnet;
a mounting member to mount the magnet;
a weight mounted on the mounting member;

a bearing mechanism rotatably supporting the mounting member within the container, the bearing mechanism being immersed in a fluid inserted in a space between an interior surface of the container and an exterior surface of the mounting member;

a plurality of magnetoelectric transducers mounted on the container;

the tilt detector detecting a tilt condition from signals generated by the magnetoelectric transducers due to changes in a relative position of the magnet and the magnetoelectric transducers and the mounting member rotates within the container, wherein:

the container encloses a substantially spherical space,
the mounting member is substantially a hollow sphere, and
the magnet is mounted on an interior surface of the spherical mounting member.

9. A tilt detector, comprising:

a container;

a magnet;

a mounting member to mount the magnet;

a weight mounted on the mounting member;

a bearing mechanism rotatably supporting the mounting member within the container, the bearing mechanism being immersed in a fluid inserted in a space between an interior surface of the container and an exterior surface of the mounting member;

a plurality of magnetoelectric transducers mounted on the container;

the tilt detector detecting a tilt condition from signals generated by the magnetoelectric transducers due to changes in a relative position of the magnet and the magnetoelectric transducers and the mounting member rotates within the container, wherein:

the container encloses a substantially cylindrical space,
the mounting member is substantially rod-shaped, and
the magnet is mounted on an exterior surface of the rod-shaped mounting member.

* * * * *

UNITED STATES PATENT AND TRADEMARK OFFICE
CERTIFICATE OF CORRECTION

PATENT NO.    : 6,543,147 B2
DATED         : April 8, 2003
INVENTOR(S)   : Shinichiro Akieda It is certified that error appears in the above-identified patent and that said Letters Patent is hereby corrected as shown below:

<u>Title page,</u>
Item [73], Assignee, change "Limted" to -- Limited --.

Signed and Sealed this

First Day of July, 2003

JAMES E. ROGAN
*Director of the United States Patent and Trademark Office*